United States Patent
Shiono (10) Patent No.: US 6,201,233 B1
(45) Date of Patent: Mar. 13, 2001

(54) POSITION DETECTION ELEMENT, POSITION DETECTION DEVICE, AND POSITION INPUT DEVICE

(75) Inventor: Koichi Shiono, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/106,495

(22) Filed: Jun. 29, 1998

(30) Foreign Application Priority Data

Jun. 30, 1997 (JP) .................................................. P9-174459

(51) Int. Cl.[7] ....................................................... G01J 1/42
(52) U.S. Cl. ........................ 250/208.2; 250/221; 327/515
(58) Field of Search ............................ 250/208.1, 208.2, 250/208.3, 214 R, 214 A, 214 LS, 221; 348/303, 308, 311, 315; 327/514, 515

(56) References Cited

U.S. PATENT DOCUMENTS 5,288,993 * 2/1994 Bidiville et al. ..................... 250/221
5,949,483 * 9/1999 Fossum et al. .................... 250/208.1

* cited by examiner

Primary Examiner—John R. Lee
Assistant Examiner—Kevin Pyo
(74) Attorney, Agent, or Firm—Sonnenschein, Nath & Rosentahl

(57) ABSTRACT

A position detection element is provided with a photoelectric conversion unit comprising a plurality of pixels arranged on a straight line, a switch group for switching the output of pixels, the first memory group, the second memory group, the first switch group for selecting a memory from the first memory group, the second switch group for selecting a memory from the second memory group, the first signal line for transmitting a signal from the first memory group, the second signal line for transmitting a signal from the second memory group, and a differential amplifier for detecting the difference between signals inputted respectively from the first signal line and the second signal line, and these components constitute the position detection element. The output of the photoelectric conversion unit is supplied to the first memory group and second memory group every prescribed time interval, a moving object is specified based on the differential signal during the time period, and the moving information is obtained.

5 Claims, 9 Drawing Sheets

POSITION DETECTION ELEMENT, POSITION DETECTION DEVICE, AND POSITION INPUT DEVICE

BACKGROUND OF THE INVENTION

1. Field of the Invention

This invention relates to a position detection sensor, and a position detection device and a position input device incorporated with the position detection element.

2. Description of Related Art

Various conventional elements, devices, and methods used for detecting optically the position and motion of an object have been proposed and commercialized heretofore. In one example of a light detection element, a light detection layer and a resistance layer having an even resistance value are laminated to form a prescribed length of a laminate and an output electrode is provided on both ends thereof. In the light detection element, for example, a laser beam namely a light source is irradiated onto a light detection element, the photoelectric current generated thereby is measured at both ends to determine the laser irradiated position on the light detection element based on two current values. The above-mentioned light detection element may be formed in planer shape to detect the two-dimensional position or motion of an object.

However, in the above-mentioned method, it is required that an object must have a light source, and the light must be focused accurately on a light detection element. Therefore it is impossible for a light detection element to extract a moving object out of unspecified objects and to measure the position.

In another example of a method for detecting the position and motion of an object, an image pick-up element such as an area sensor of CCD (Charge Coupled Device) and an image memory are utilized. In this method, image information from an image pick-up element is stored in an image memory every prescribed time interval, and changed points of the image are extracted from a plurality of stored image information to detect the position and motion.

According to the method which utilizes CCD area sensor, moving objects are extracted from non-specific objects, and the position and motion are detected. However, a detection device which utilizes this method is inevitably large, and a memory having a large capacity and a high-speed operation CPU are required because of large image information to be processed, and such requirements makes disadvantageously the detection system very expensive.

It has been difficult to construct a position input device, for example, a pointing device such as a mouse because of the problem of the above-mentioned device.

SUMMARY OF THE INVENTION

Accordingly, it is an object of the present invention to provide a position detection element, a position detection device, and a position input device having a simple and inexpensive structure for detecting the position and motion of an object.

The present invention is accomplished in view of the above-mentioned problem, a position detection element is provided with a light detection means comprising a plurality of light detection elements arranged on a straight line, the first memory means for storing detection signal of the light detection means, the second memory means for storing detection signal of the light detection means, the first switch means for connecting any one of the first memory means and the second memory means to the light detection means, the difference detection means for detecting the difference between signals stored in memory elements corresponding respectively to the first memory means and the second memory means, and the second switch means for switching successively the memory element corresponding respectively to the first memory means and the second memory means.

A memory means for storing analog quantity is used as the first memory means and the second memory means respectively.

The light detection means comprises a MOS type light detection element, and the first memory means and the second memory means comprise respectively a capacitive element.

A position detection element is provided with a light detection means comprising a plurality of light detection elements arranged on a straight line, the first charge storage transfer means for storing and transferring detection signal of the light detection means, the second charge storage transfer means for storing and transferring detection signal of the light detection means, the first switch means for inputting detection signal of the light detection means to the first charge storage transfer means, the second switch means for inputting detection signal of the light detection means to the second charge storage transfer means, and a difference detection means for detecting the difference between signals stored in charge storage elements corresponding respectively to the first charge storage transfer means and the second charge storage transfer means.

The first charge storage transfer means and the charge storage transfer means comprise respectively a CCD.

A position detection device provided with any one of the above-mentioned position detection elements, a means for recognizing a moving object based on the output from the position detection element, and a means for calculating the moving position of the moving object based on the output from the position detection element.

The above-mentioned problem is solved by using a position input device provided with two of any one of the above-mentioned position detection elements arranged in orthogonal two directions, a means for calculating the respective moving quantity of the position detection elements based on the output from the respective position detection elements, and a means for pointing a position on a screen of a display device based on the obtained moving quantity of the respective position detection elements arranged in the orthogonal two directions.

By applying the element structure of the present invention, a position detection element which is capable of extracting a moving object out of unspecified objects, and detecting the position and motion of the object without using a dedicated light source is realized. Position detection devices and position input devices which are compact, inexpensive, and easy to use are provided by applying position detection elements of the present invention.

DETAILED DESCRIPTION OF THE PREFERRED EMBODIMENTS

Figure 1:
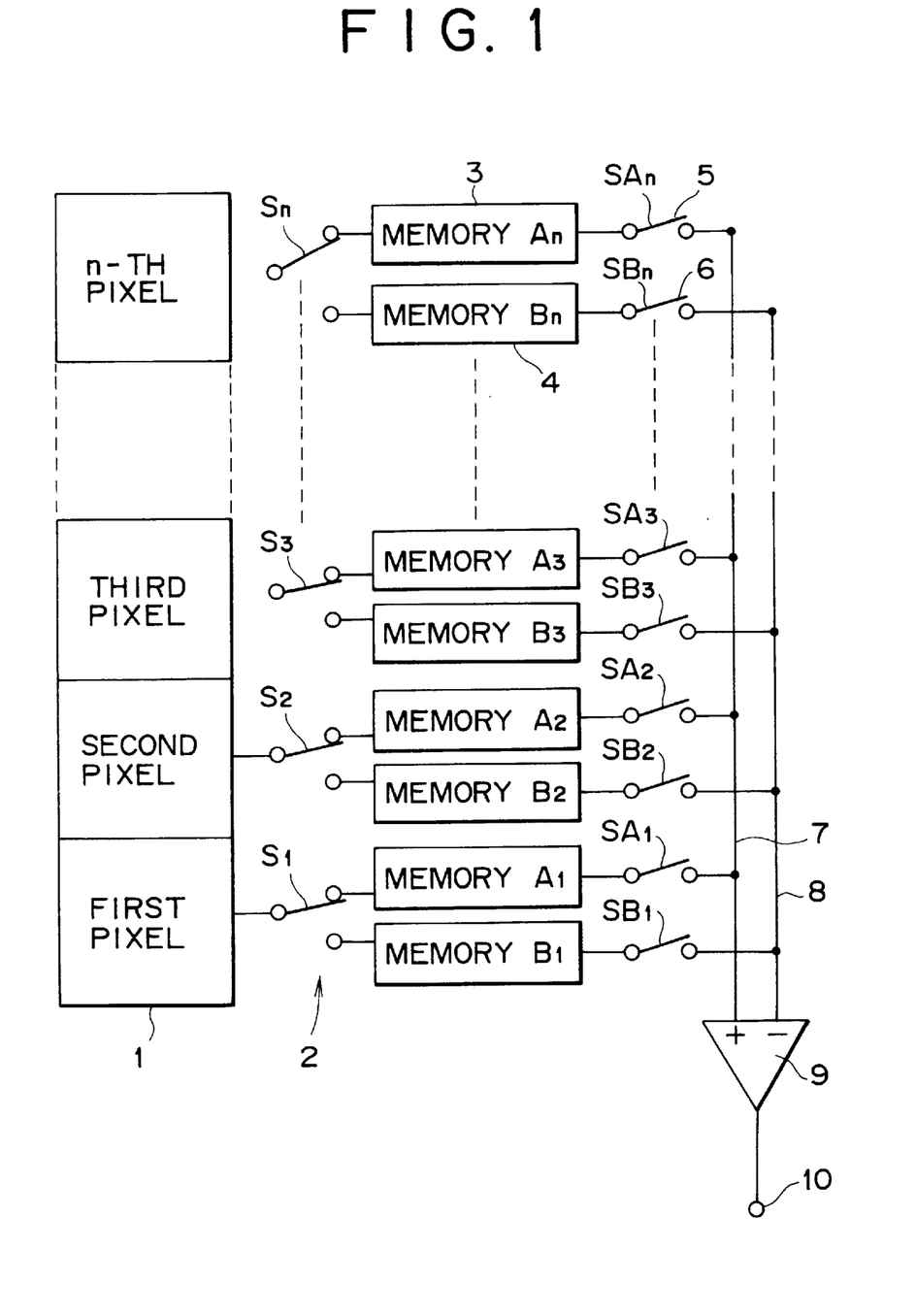
FIG. 1 is a diagram for illustrating the structure of a position detection element in accordance with the present invention.
Figure 3:
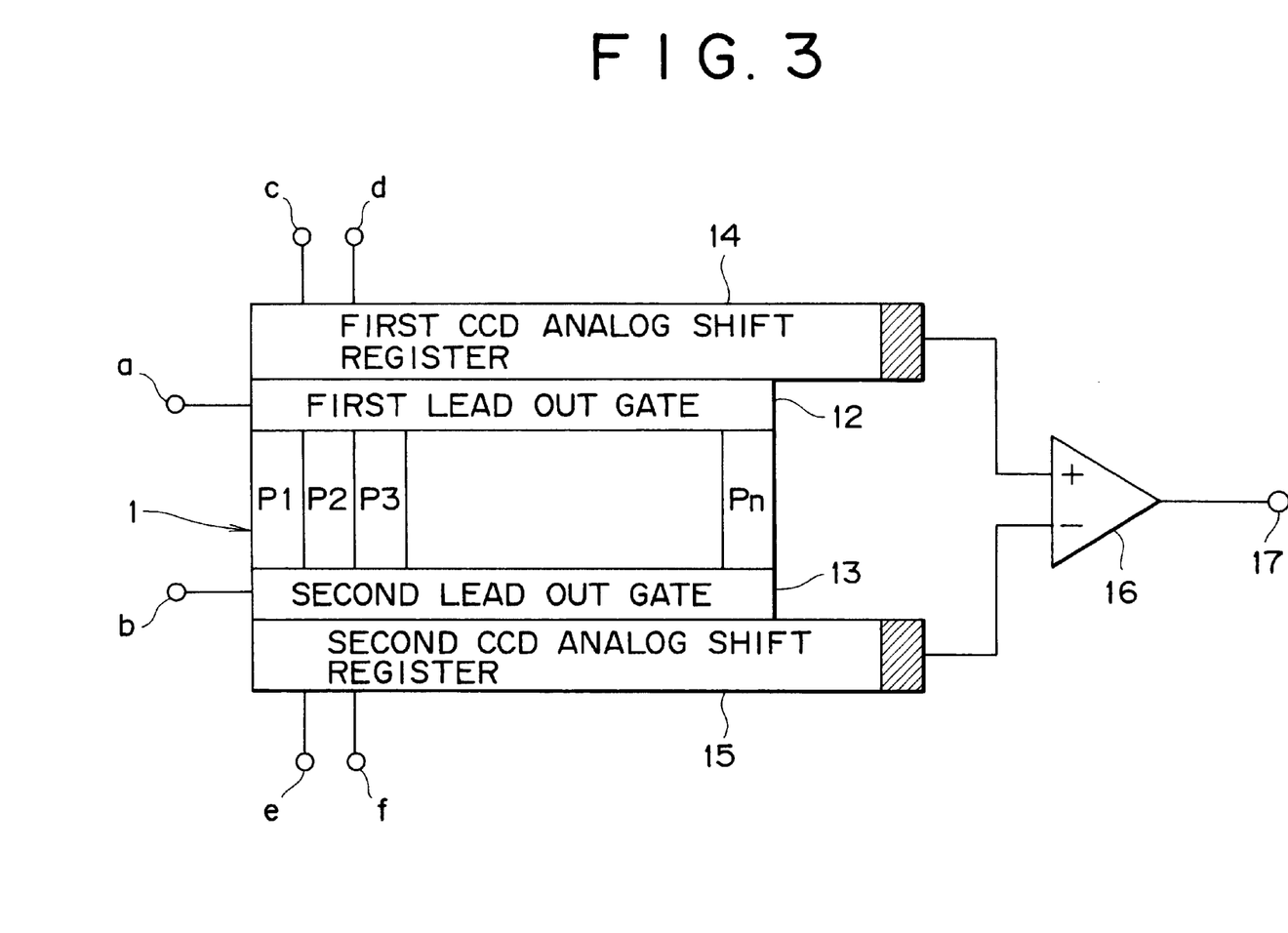
FIG. 3 is a diagram for illustrating the structure of the first embodiment of the present invention.
Figure 4:
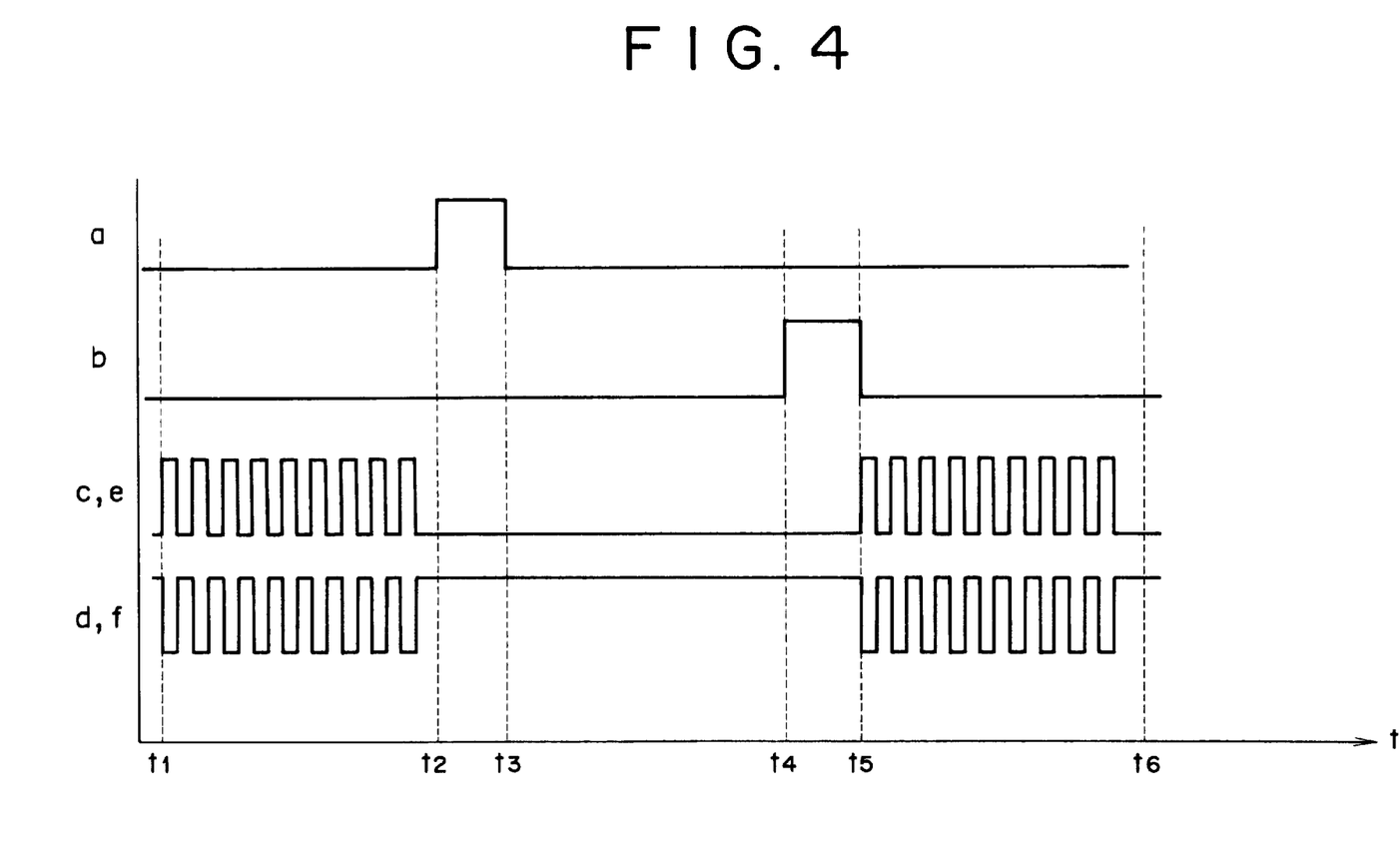
FIG. 4 is a diagram for describing operation timing of the first embodiment.
Figure 7:
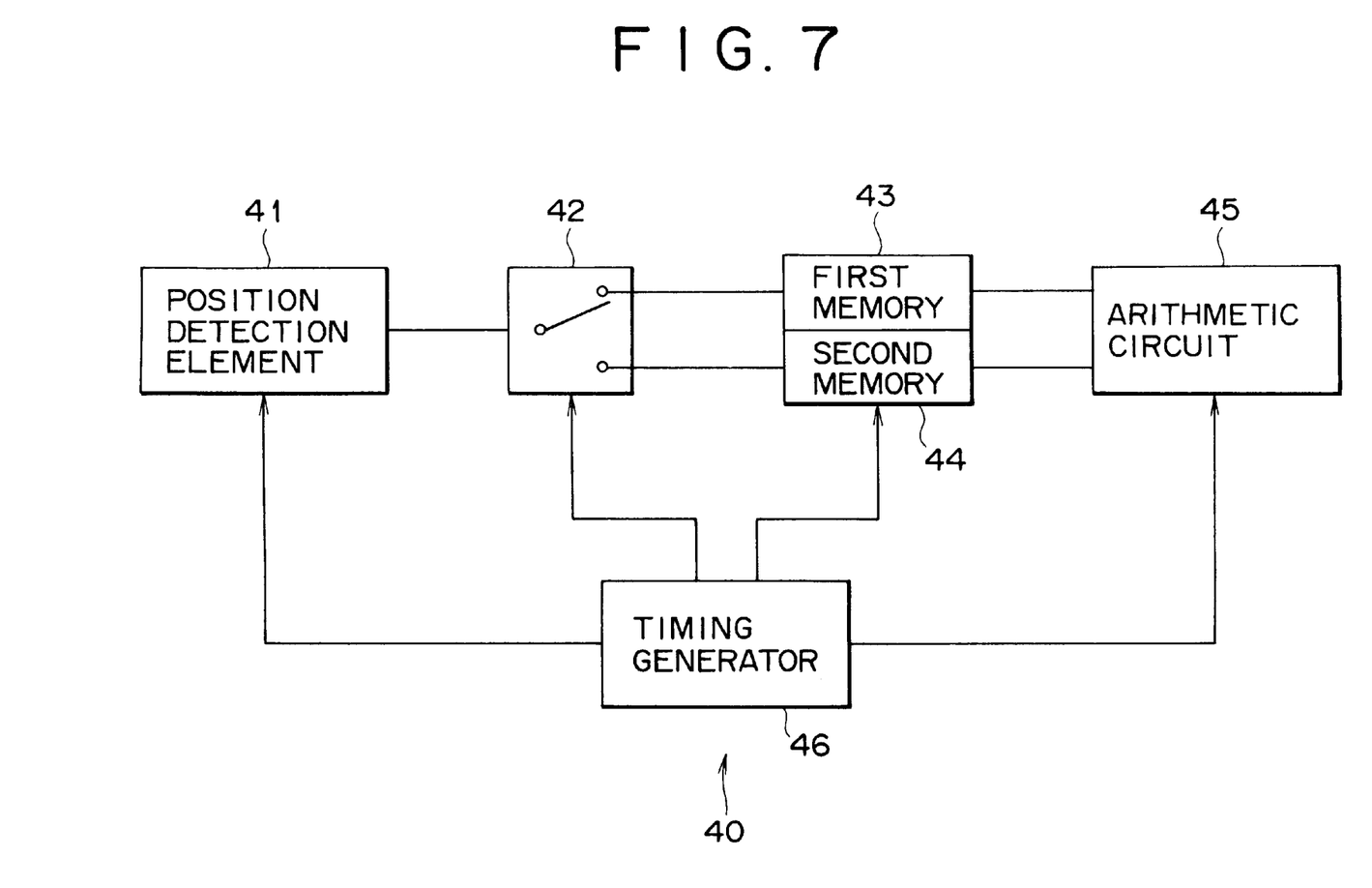
FIG. 7 is a block diagram for illustrating a position detection device which is incorporated with a position detection element of the present invention.
Figure 8A:
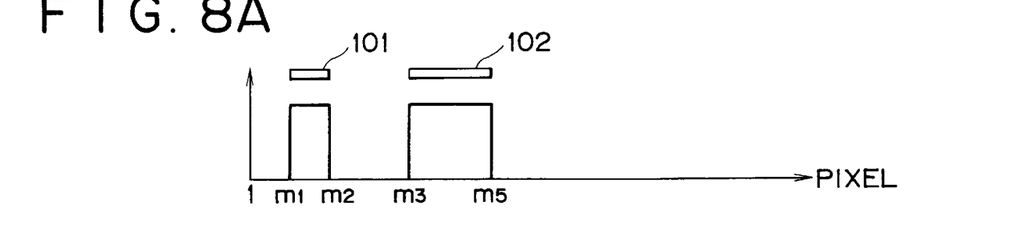
FIGS. 8A to 8E are a set of diagrams for describing the operation of the position detection device shown in FIG. 7.
Figure 8B:
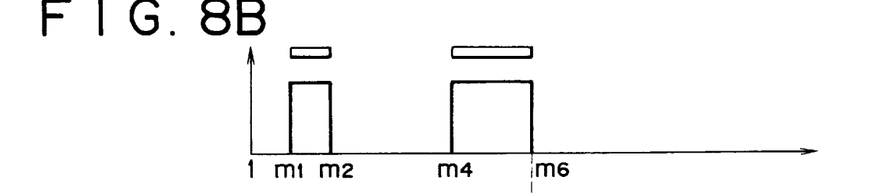
Figure 8C:
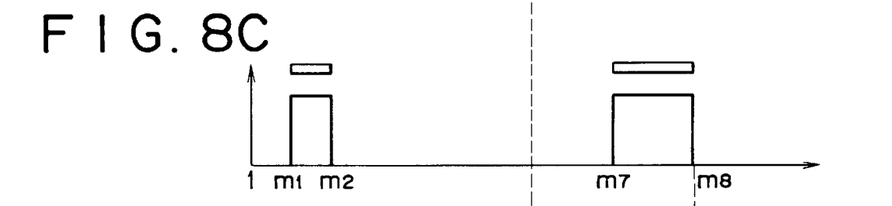
Figure 8D:
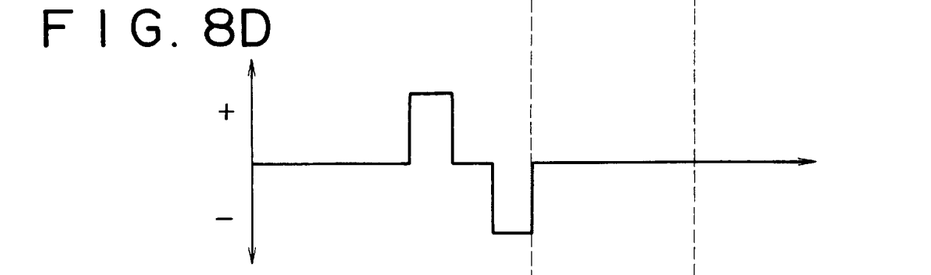
Figure 8E:
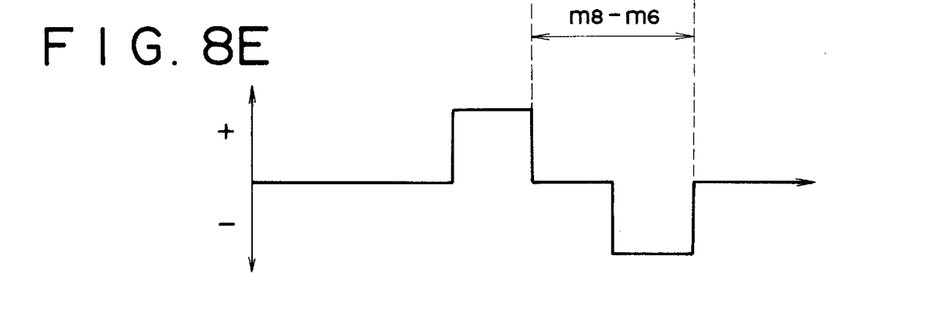
Figure 9:
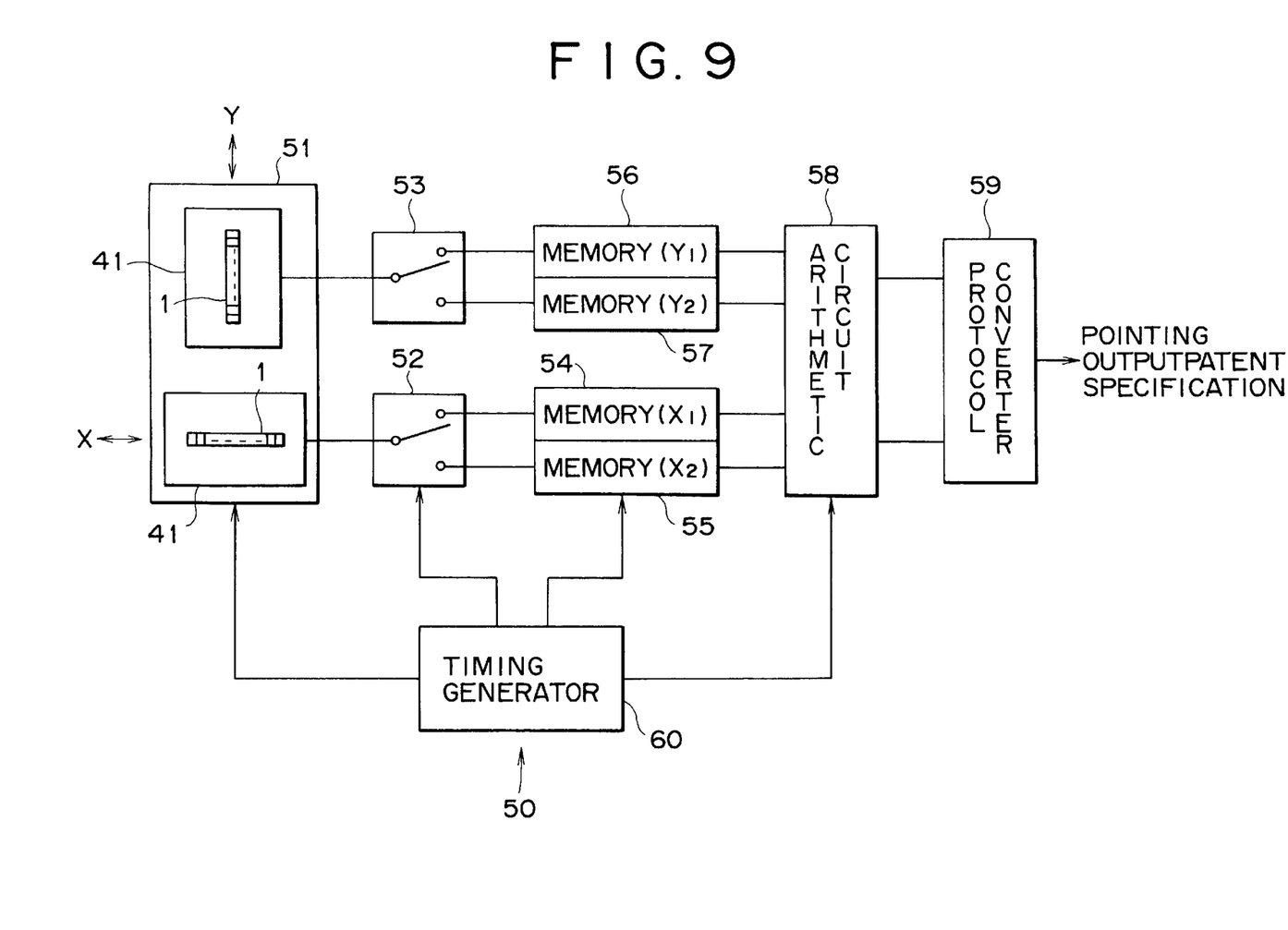
FIG. 9 is a block diagram for illustrating a position input device which is incorporated with a position detection element of the present invention.

Embodiments of the present invention will be described in detail hereinafter with reference to FIG. 1 through FIG. 9. FIG. 1 is a diagram for illustrating the structure of a position detection element in accordance with the present invention, and FIG. 2 is a diagram for describing position detection operation. FIG. 3 is a diagram for illustrating the exemplary structure of the first embodiment of the present invention, and FIG. 4 is a diagram for describing operation timing. FIG. 7 is a block diagram of a position detection device using a position detection element of the present invention, and FIG. 8 is a diagram for describing operation. Further, FIG. 9 is a block diagram of a position input device which utilizes a position detection element of the present invention.

As shown in FIG. 1, the position detection element in accordance with the present invention is provided as structural elements with a photoelectric conversion unit 1 comprising a plurality of first to n-th pixels arranged on a straight line, a switch group 2 comprising switches $S_1$ to $S_n$ for switching output from respective pixels, the first memory group 3 comprising memories $A_1$ to $A_n$, the second memory group 4 comprising memories $B_1$ to $B_n$, the first switch group 5 comprising switches $SA_1$ to $SA_n$ for selecting a memory from the first memory group 3, the second switch group 6 comprising switches $SB_1$ to $SB_n$ for selecting a memory from the second memory group 4, the first signal line 7 for transmitting signal from the first memory group 3, the second signal line 8 for transmitting signal from the second memory group 4, and a differential amplifier 9 for detecting a difference between signals inputted from the first signal line 7 and the second signal line 8.

Next, operations are described. First, respective pixels of the photoelectric conversion unit 1 are connected to corresponding memories $A_1$ to $A_n$ of the first memory group 3 by the switch group 2, and data detected by respective pixels (analog data corresponding to quantity of light) are stored. After a prescribed time, the respective pixels of photoelectric conversion unit 1 are connected to corresponding memories $B_1$ to $B_n$ of the second memory group 4 by the switch group 2, and outputs of data detected by respective pixels are stored.

Data stored in the first memory group 3 and second memory group 4 are supplied to a differential amplifier 9 through respectively the first signal line 7 and second signal line 8 by operating successively respective switches of the first switch group 5 and second switch group 6 corresponding to the respective memories. In detail, first memory $A_1$ of the first memory group 3 is connected to the first signal line 7 and on the other hand the memory $B_1$ of the second memory group 4 is connected to the second signal line 8, and the differential amplifier 9 detects the difference between two data and outputs the difference data from an output terminal 10. The position detection element continues difference detection from the combination of the memory $A_1$ and memory $B_1$ to the combination of the memory $A_n$ and memory $B_n$.

The form of output from the position detection element having the above-mentioned structure is described with reference to FIG. 2. Herein, for purposes of simple explanation, output waveform of binary waveform is shown herein, but in general output waveform is analog waveform, and the following description is adaptable also for analog waveform.

Figure 2A:
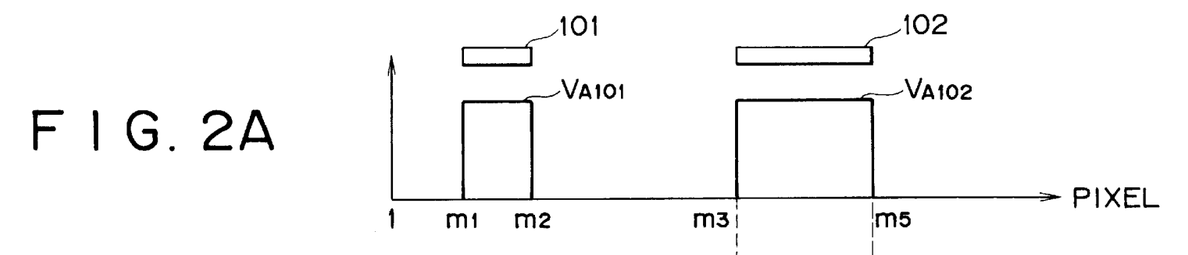
FIGS. 2A to 2C are a set of diagrams for describing position detection operation of the position detection element in accordance with the present invention.

FIG. 2A shows an output waveform of the photoelectric conversion unit 1 to be recorded in the first memory group 3, a detection signal of an object 101 is represented by $V_{A101}$ and a detection signal of an object 102 is represented by $V_{A102}$. An image of the object 101 is outputted from pixels of the pixel $m_1$ and pixel $m_2$, and an image of the object 102 is outputted from pixels of the pixel $m_3$ to pixel $m_5$. When, the switch group 2 is connected to the first memory group 3, and signals are stored in the memories $A_1$ to $A_n$ corresponding to the pixels $m_1$ to $m_n$.

Figure 2B:
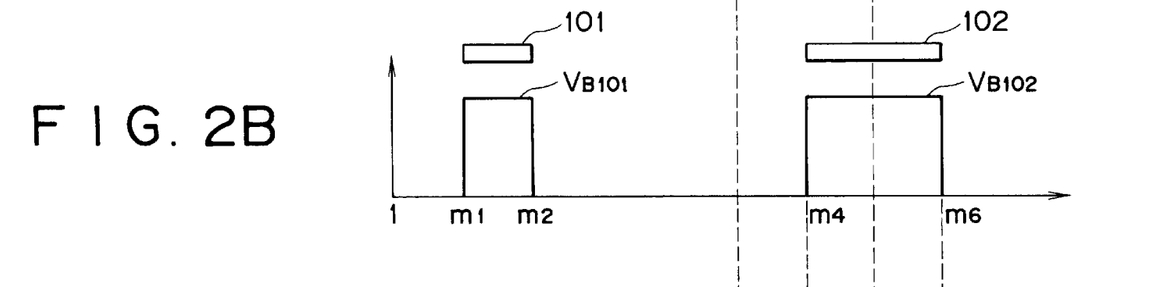

Next, similarly the output from the photoelectric conversion unit 1 is fetched by the second memory group 4. FIG. 2B shows output waveform from the photoelectric conversion unit 1 after a prescribed time, a detection signal of the object 101 is represented by $V_{B101}$ and a detection signal of the object 102 is represented by $V_{B102}$. When, an image of the object 101 is outputted from the pixel $m_1$ and the pixel $m_2$, and an image of the object 102 is outputted from pixels of the pixels $m_4$ to $m_6$. The switch group 2 is connected to the second memory group 4, and signals are stored in memories $B_1$ to $B_n$ corresponding to the pixels $m_1$ to $m_n$.

Figure 2C:
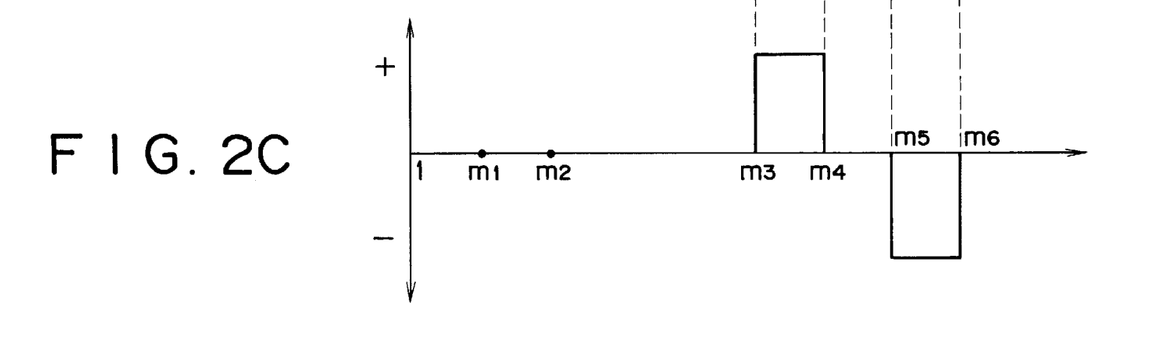

Next, signals are inputted from the first memory group 3 and the second memory group 4 to the differential amplifier 9 through the first signal line 7 and the second signal line 8 by operating the first switch group 5 and the second switch group 6 simultaneously so that a memory of the first memory group 3 and a memory of the second memory group 4 are paired correspondingly, that is, the memory $A_1$ and the memory $B_1$ are paired together, the memory $A_2$ and the memory $B_2$ are paired together, . . . , the memory $A_n$ and the memory $B_n$ are paired together. FIG. 2C shows the output from the differential amplifier 9 when the memories are paired, the range from the pixel $m_1$ to the pixel $m_2$ is "0", the range from the pixel $m_3$ to the pixel $m_4$ is "+", the range from the pixel $m_4$ to the pixel $m_5$ is "0", and the range from the pixel $m_5$ to the pixel $m_6$ is "−". This data indicates that the object 101 did not move within a time period from the first signal fetch to the second signal fetch, and on the other hand, the object 102 moved from the pixel $m_5$ to the pixel $m_6$ on the photoelectric conversion unit 1.

As the result, a moving object is detected, and the moving speed is also calculated from the time difference between the first signal fetch and the second signal fetch based on the fact that the length between the pixel $m_5$ and pixel $m_6$ corresponds to the moving distance of the object 102 if the magnification of both optical systems is equal. If the magnification is different between the optical systems, the moving distance and moving speed are calculated in consideration of the magnification.

Next, the first embodiment of the position detection element in accordance with the present invention will be described with reference to FIG. 3 and FIG. 4. In this embodiment, the present invention is realized by using a CCD linear sensor.

The photoelectric conversion unit 1 shown in FIG. 1 is provided with a photodiode array 11 comprising photodiodes $P_1$ to $P_n$, the switch group 2 comprises the first lead out gate 12 and second lead out gate 13, and the first memory group 3 and the second memory group 4 comprises the first CCD analog shift register 14 and the second CCD analog shift register 15 respectively.

The signal of the photodiodes $P_1$ to $P_n$ outputted to the first CCD analog shift register 14 and the second CCD analog shift register 15 is detected by operating the first lead out gate 12 and the second lead out gate 13. The first switch group 5 and the second switch group 6 are operated by transferring the first CCD analog shift register 14 and the second CCD analog shift register 15.

The outputs from the first CCD analog shift register 14 and the second CCD analog shift register 15 are inputted to the differential amplifier 16, the difference between the first detection signal and second detection signal of each photodiode is detected and outputted from the output terminal 17. A terminal-a is a control terminal of the first lead out gate 12 and a terminal-b is a control terminal of the second lead out gate 13, and terminals-c and -d are transmission clock terminals of the first CCD analog shift register 14 and terminals-e and -f are transmission clock terminals of the second CCD analog shift register 15.

As shown in FIG. 4, in the operation timing of the first embodiment, first the photodiodes $P_1$ to $P_n$ start photoelectric conversion at the time $t_1$. ON signal is inputted from the terminal-a to the first lead out gate 12 at the time $t_2$, and the charge photoelectrically converted and stored during the time interval between the time $t_1$ and the time $t_2$ is transferred to the first CCD analog shift register 14 during the time interval between the time $t_2$ and the time $t_3$. After completion of transfer, photoelectric conversion starts at the time $t_3$ again, ON signal is inputted from the terminal-b to the second lead out gate 13 at the time $t_4$, the charge photoelectrically converted and stored during the time interval between the time $t_3$ to the time $t_4$ is transferred to the second CCD analog shift register 15 during the time interval between the time $t_4$ and the time $t_5$. A transmission clock is inputted to the terminal-c and terminal-d, and the terminal-e and terminal-f, the charge of the first CCD analog shift register 14 and the second CCD analog shift register 15 start simultaneously to transfer and is inputted to the differential amplifier 16, and the difference between two signals is detected. It is possible to determine the motion and position of the object based on the differential output.

Figure 5:
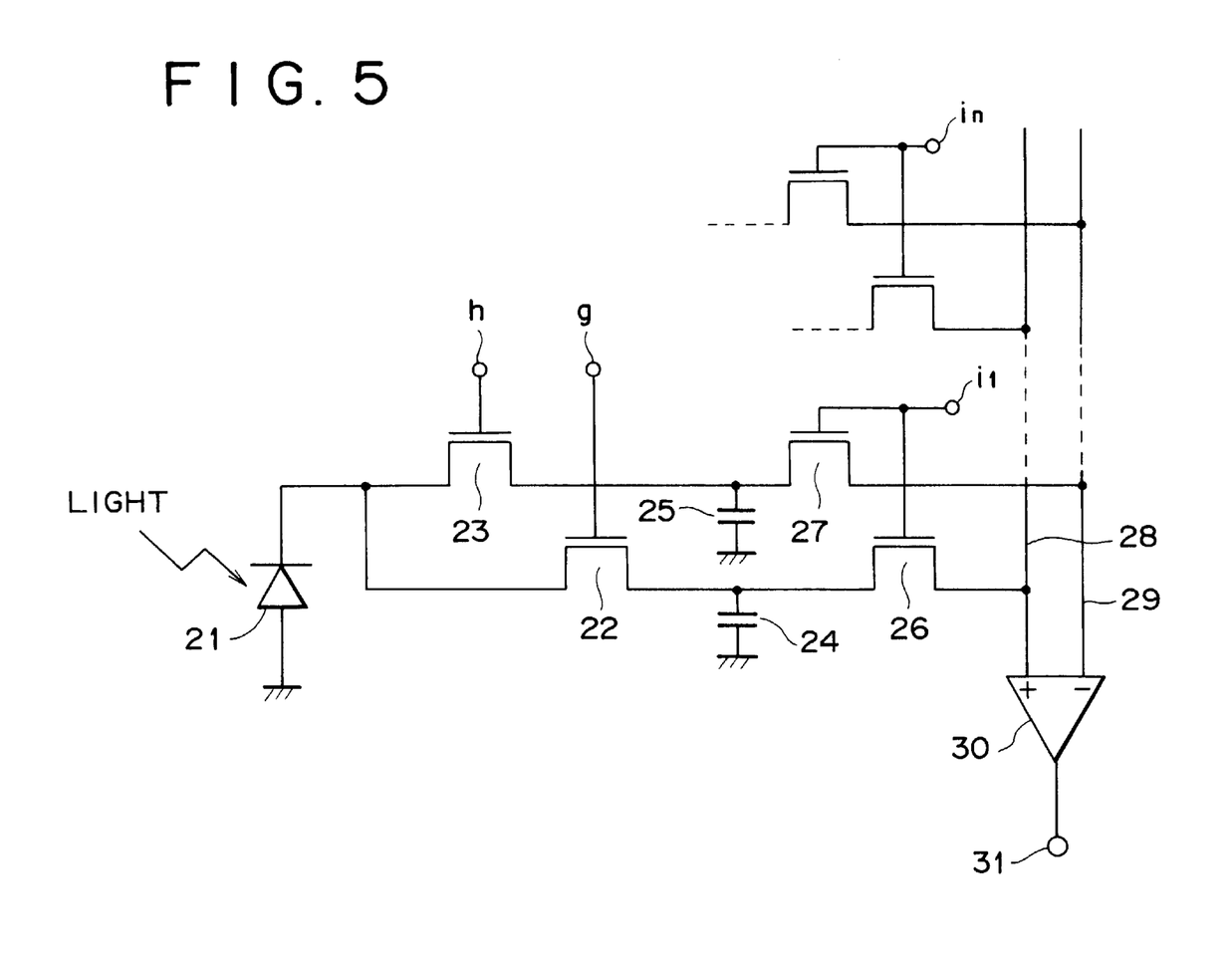
FIG. 5 is a diagram for illustrating the structure of the second embodiment of the present invention.

Next, the second embodiment of a position detection element in accordance with the present invention will be described with reference to FIG. 5 and FIG. 6. In this embodiment, the present invention is realized utilizing an analog memory circuit provided with a MOS type sensor and a capacitor.

The photoelectric conversion unit 1 shown in FIG. 1 comprises a photodiode 21, the switch group 2 comprises transmission gates 22 and 23, the first memory group 3 and second memory group 4 comprise analog memories of capacitors 24 and 25, and the first switch group 5 and second switch group 6 comprise switches 26 and 27, and these components constitute a unit structure. A number of unit structures corresponding to n elements is arranged on a straight line.

Figure 6:
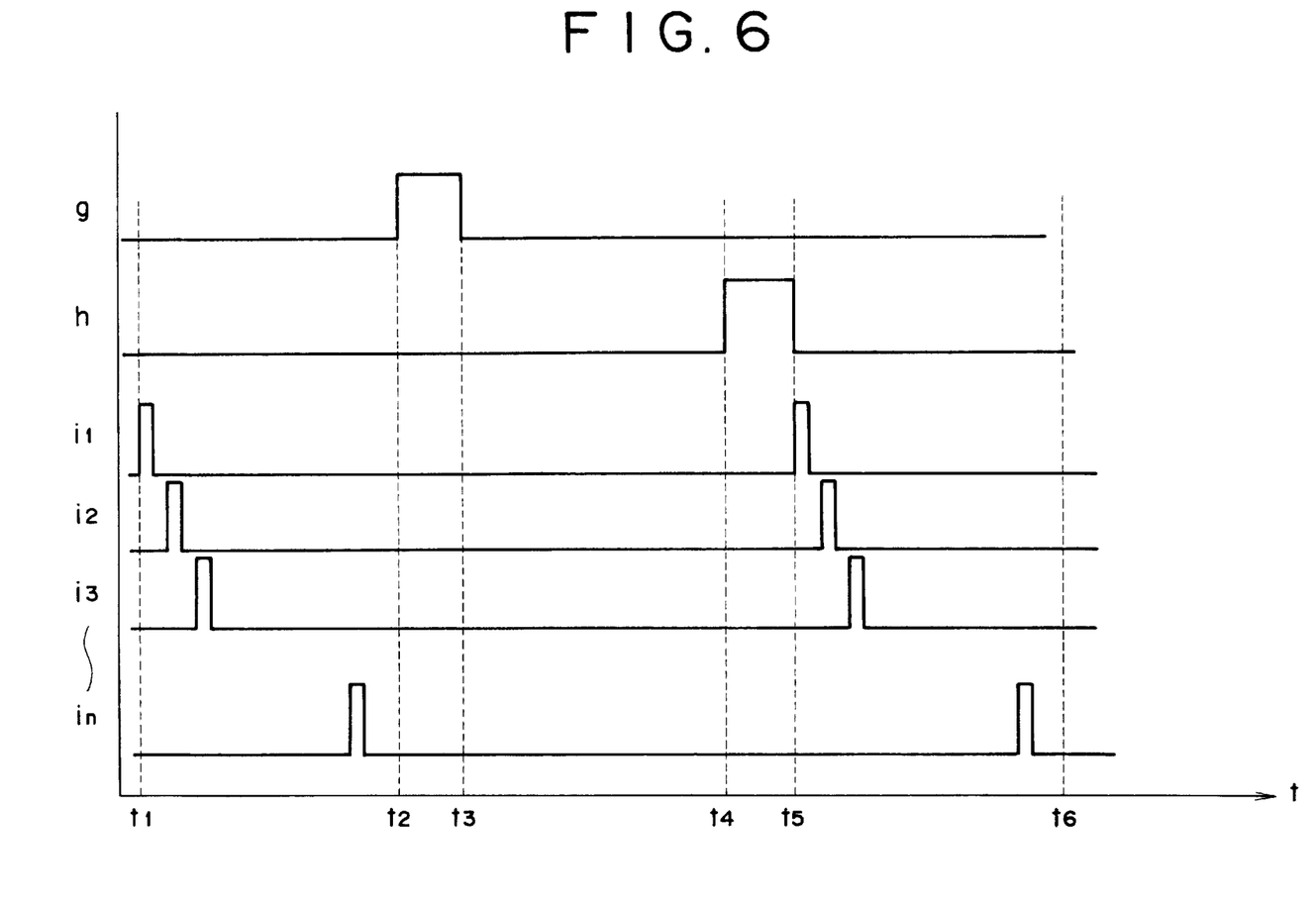
FIG. 6 is a diagram for describing operation timing of the second embodiment.

As shown in FIG. 6, in the operation timing of the second embodiment, first the photodiode 21 starts photoelectric conversion at the time $t_1$, ON signal is inputted from the terminal-g to the transmission gate 22 at the time $t_2$, and the charge photoelectrically converted during the time interval between the time $t_1$ and the time $t_2$ is stored in the capacitor 24 during the time interval between the time $t_2$ and the time $t_3$. After completion of storage, photoelectric conversion starts again at the time $t_3$, ON signal is inputted from the terminal-h to the transmission gate 23 at the time $t_4$, and the charge photoelectrically converted during the time interval between the time $t_3$ and the time $t_4$ is stored in the capacitor 25 during the time interval between the time $t_4$ and the time $t_5$. After completion of storage at the time $t_5$, ON signal is inputted successively to the terminals $i_1$ to $i_n$, and the charge stored in two capacitors corresponding to the terminal-i is inputted to the differential amplifier 30 through the first signal line 28 and the second signal line 29. The difference between two charges is detected by the differential amplifier 30, and the difference is outputted from the output terminal 31. The motion and position of the object is determined based on the difference output as described hereinbefore.

The position detection device 40 which is incorporated with a position detection element in accordance with the present invention is described with reference to FIG. 7 and FIG. 8.

A position detection device 40 is provided with a position detection element 41 having the above-mentioned structure in accordance with the present invention, a switch 42 for switching the output of the position detection element 41, the first memory 43 for storing a motion detection signal served as a reference signal from the position detection element 41, the second memory 44 for storing a motion detection signal after a prescribed time from the output of the reference motion detection signal, an operational circuit 45 for operating moving position, moving distance, and moving speed based on the information stored in the first memory 43 and second memory 44, and these components constitute the position detection device 40.

Next, the operation of the position detection device 40 is described. FIG. 8A shows output waveform of the photoelectric conversion unit 1 to be recorded in the first memory group 3 shown in FIG. 1, and FIG. 8B shows output waveform of the photoelectric conversion unit 1 to be stored in the memory group 4 after a prescribed time period. From these two data, a signal shown in FIG. 8D including motion information of the object 102 is obtained as described already with reference to FIG. 2. The signal is guided to the first memory 43 by switching the switch 42 and stored in the first memory 43. FIG. 8C is output waveform of the photoelectric conversion unit 1 further after a prescribed time period from the time of the state shown in FIG. 8B, and the signal is recorded again in the first memory group 3. From the data shown in FIG. 8B stored in the second memory group 4 and the data stored newly in the first memory group 3, similarly a signal shown in FIG. 8E including the motion information of the object 102 is obtained. When, it is required to subtract the value of the first memory group 3 from the value of the second memory group to obtain the difference. The signal is guided to the second memory 44 by switching the switch 42 and stored in the second memory 44.

Next, the moving position, moving distance, and moving speed of the object 102 is calculated by the operational circuit 45 based on the information stored in the first memory 43 and second memory 44. In calculation of the moving distance, for example, pixels which rise from "−" to "0" in FIG. 8D and FIG. 8E are picked up, and the moving distance is obtained from the number of pixels between the two rising pixels and a pixel pitch. The rising pixel in FIG.

8D is $m_6$ and the rising pixel in FIG. 8E is $m_8$, therefore the number of moving pixels of the object 102 on the photoelectric conversion unit 1 is represented by $m_8$–$m_6$. The moving position may be determined to be the position of the pixel which falls from "0" to "–" or alternatively to be the position of the pixel which rises from "–" to "0".

The moving speed is obtained from the moving distance and the time interval between the time when the signal is fetched by the first memory group 3 and the time when the signal is fetched by the second memory group 4.

Continuous moving information is obtained by repeating the above-mentioned operation.

Further, the present invention is by no means limited to the above-mentioned equal magnification, and alternatively an optical system of a prescribed magnification is provided in front of the position detection device, and data is calculated in consideration of the magnification to obtain the moving information of a moving object.

Next, a position input device 50 which is incorporated with a position detection element in accordance with the present invention, namely so-called mouse which is typical of a pointing device, is described with reference to FIG. 9. The signal detection method is same as the method used for the position detection device 40, therefore will be described with reference to FIG. 8 as required.

The position input device 50 is provided with a position detection unit 51 comprising two position detection devices 41 shown in FIG. 7 which are combined and arranged in two orthogonal axis directions (respectively X axis and Y axis), a switch (X) 52 for switching X axis output of the position detection unit 51, a switch (Y) 53 for switching Y axis output, a memory ($X_1$) 55 and a memory ($X_2$) for storing X axis output, a memory ($Y_1$) 56 and a memory ($Y_2$) 57 for storing Y axis output, an operational circuit 58 for calculating the moving information, a protocol converter 59 for converting to pointing information based on the calculation result of the operational circuit 58, and a timing generator 60 for controlling operation timing of these structural components, and thus these components constitute the position input device 50.

In the operation of the position input device 50, X axis moving information is switched by the switch (X) 52 every prescribed time period to record the information in the memory ($X_1$) 54 and memory ($X_2$) 55 alternately, and Y axis moving information is switched by the switch (Y) 53 to record the information in the memory ($Y_1$) 56 and memory ($Y_2$) 57 alternately when the position detection unit 51 is moved. After completion of the record, the moving distance and moving direction of the object in the respective directions are calculated by the operational circuit 58 based on the recorded information as described herein above. Next, the calculated information is converted to pointing information by the protocol converter 59 based on the calculation result, the converted information is inputted to a display device, and a position on the display screen is pointed.

According to the pointing device of the present invention, it is not required to operate a pointing device on a pad as it is conventional for a mouse, instead a position on a screen of a display device is pointed by moving the pointing device held in a hand on a background of suitable contrast.

As it is obvious from the above-mentioned description, a position detection device is structured simply and easily by using a position detection element of the present invention.

A position on a screen of a display device is easily pointed by using a position input device which is incorporated with a position detection element of the present invention.

What is claimed is:

1. A position detection element comprising:

light detection means comprising a plurality of light detection elements arranged on a straight line, first memory means for storing a first detection signal at a first time of said light detection means, wherein said first detection signal corresponds to a moving object;

second memory means for storing a second detection signal at a second time of said light detection means wherein said second detection signal corresponds to said moving object;

first switch means for connecting said first memory means and said second memory means to said light detection means;

difference detection means for detecting a difference between said first detection signal and said second detection signal; and second switch means for successively connecting said first memory means and said second memory means to said difference detection means.

2. A position detection element as claimed in claim 1, wherein said first memory means and said second memory means store analog data.

3. A position detection element as described in claim 1, wherein said light detection means comprises a MOS type light detection element, and said first memory means and said second memory means each comprise a capacitive element.

4. A position detection device comprising:

a position detection element as claimed in claim 1;

means for recognizing the moving object based on an output from said position detection element; and means for calculating a position of the moving object based on the output from said position detection element.

5. A position input device comprising:

at least two position detection elements as claimed in claim 1 arranged in orthogonal directions;

means for calculating a moving quantity of each of said position detection elements based on an output from each of said position detection elements; and means for pointing IQ a position on a screen of a display based on the moving quantities of said position detection elements arranged in the orthogonal directions.

* * * * *